United States Patent [19]

Hill

[11] Patent Number: 4,486,867
[45] Date of Patent: Dec. 4, 1984

[54] TRANSMIT/RECEIVE SOLID STATE SWITCHING SYSTEM

[75] Inventor: Lyle M. Hill, Portsmouth, R.I.

[73] Assignee: Raytheon Company, Lexington, Mass.

[21] Appl. No.: 353,447

[22] Filed: Mar. 1, 1982

[51] Int. Cl.³ .............................................. G01S 7/52
[52] U.S. Cl. .................................. 367/87; 200/61.02; 367/903
[58] Field of Search ............... 367/87, 903; 200/61.02; 307/99, 117; 343/5 SW; 455/78, 79, 82, 83

[56] References Cited

U.S. PATENT DOCUMENTS

| | | | |
|---|---|---|---|
| 3,414,872 | 12/1968 | Barron | 367/903 |
| 3,562,597 | 2/1971 | White | 455/82 |
| 4,139,834 | 2/1979 | Matsui et al. | 367/87 |
| 4,236,084 | 11/1980 | Gingras | 307/117 |
| 4,263,646 | 4/1981 | Beatty | 361/86 |
| 4,277,710 | 7/1981 | Harwood et al. | 310/316 |
| 4,360,853 | 11/1982 | Welk | 340/660 |
| 4,387,434 | 6/1983 | Moncrief, Jr. et al. | 340/870.16 |

Primary Examiner—Richard A. Farley
Attorney, Agent, or Firm—Martin M. Santa; Joseph D. Pannone; Richard M. Sharkansky

[57] ABSTRACT

A solid state transmit/receive switching circuit is provided by a system which, in accordance with the invention, comprises a solid state relay which, when energized, causes an optically controlled resistor connected to an input terminal of a preamplifier of the receiver to change its resistance and hence the sensitivity of the preamplifier according to the transmitter transmission state.

6 Claims, 1 Drawing Figure

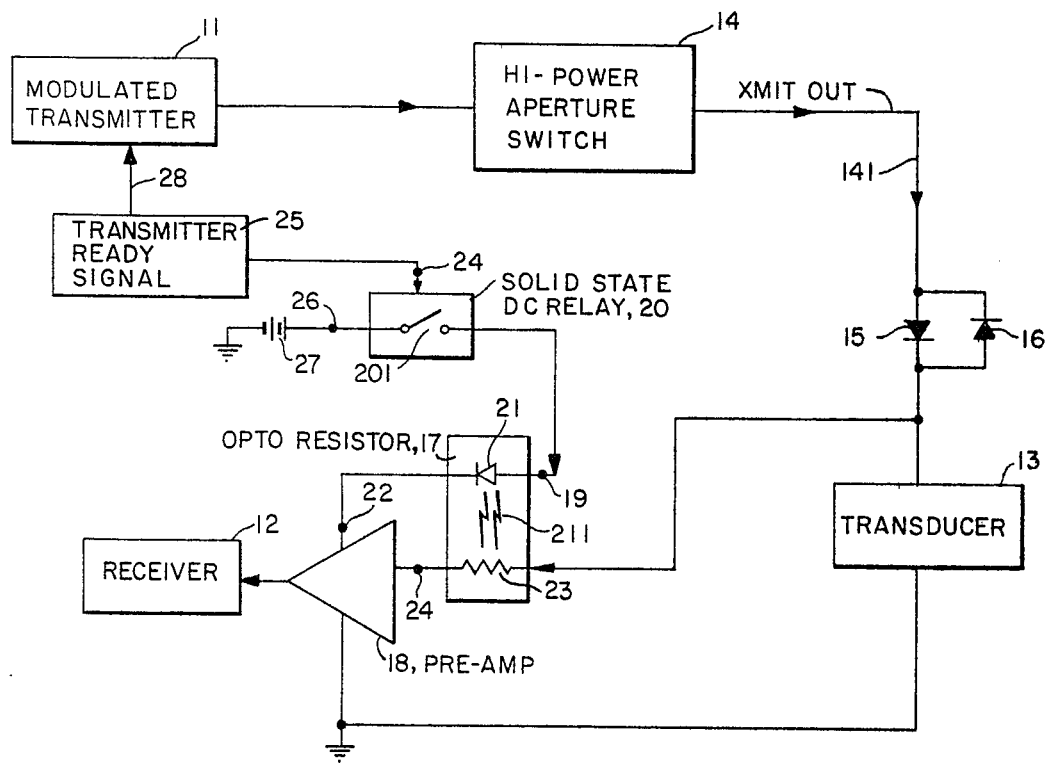

TRANSMIT/RECEIVE SOLID STATE SWITCHING SYSTEM

BACKGROUND OF THE INVENTION

This invention relates to a transmit/receive switching system and more particularly to a switching system particularly adapted to be utilized in a sonar system.

The prior art transmit/receive switching circuits utilize an electromechanical relay to disconnect the receiver from the transducer during the time that the transmitter is providing power to the transducer. The use of electromechanical relays with their attendant power supply requirements not only occupies valuable space in the environment in which sonar is customarily employed, but also the wiring to the energizing coil of the relay tends to induce hum occurrence into the input of the amplifier which is connected to the relay contacts. Because the signals received by the transducer are of the same order of magnitude as the signals induced by the power supply to the coil of the relay, substantial difficulties are produced especially where the relay is located at some distance from the preamplifier.

It is therefore an object of the present invention to provide the required isolation between the receiver and the transmitter without utilizing electromechanical components by the use of only solid state components which are in general more reliable and less expensive and which do not have the power supply requirements nor the space requirements of the electromechanical relays.

SUMMARY OF THE INVENTION

The aforementioned problems are overcome and other objects and advantages of a solid state transmit/receive switching circuit are provided by a system which, in accordance with the invention, comprises a solid state relay which, when energized, causes an optically controlled resistor connected to an input terminal of a preamplifier of the receiver to change its resistance and hence the sensitivity of the preamplifier according to the transmitter transmission state.

BRIEF DESCRIPTION OF THE DRAWINGS

The aforementioned aspects and other features of the invention are explained in the following description taken in conjunction with the accompanying drawing in which the FIGURE is an electrical schematic of the transmit/receive system of this invention.

DESCRIPTION OF THE PREFERRED EMBODIMENT

Referring to the FIGURE, there is shown an electrical schematic of the transmit/receive circuitry 10 of this invention suitable for use with sonar systems. The FIGURE shows only one channel comprising a modulated transmitter 11 and receiver 12. It will be recognized by those skilled in the art that a sonar system comprises many such transmitter/receiver channels 10 such as shown in the FIGURE where the transmitters 11 are synchronized and phased to produce a desired transmit antenna pattern from a plurality of transducers 13. It will be further recognized by those skilled in the art that each transducer 13 may form an element in an array of transducers having a total number of elements greater than the number of transmitters 11. In that instance, the transducers 13, which are to be energized by the transmitters 11, are individually selected by high power switches 14 which result in each transmitter 11 being connected to a particular transducer 13 by each of the aperture switches 14. Connected between each transmitter and transducer is a pair of parallel connected diodes 15, 16 which are connected to each other in reverse polarity.

An optically sensitive resistance device 17 is connected between the preamplifier 18 of receiver 12 and the junction of the diodes 15, 16 and the transducer 13. The optically sensitive resistor 17 has another input 19 connected to the output of a solid state direct current relay 20. The input 19 of optical resistor 17 is connected to a light emitting diode 21 contained within the optical resistor 17 as an element thereof. The other terminal of diode 21 is connected to the direct current power input terminal 22 of the preamplifier 18. The optically sensitive resistor 23 of optical resistor unit 17 is connected between the junction of diodes 15, 16 and transducer 13 and an input terminal 24 of the preamplifier 18. The solid state d.c. relay 20, which is connected to the optically sensitive resistor 17, has a control input 24 which is connected to a transmitter "ready" signal source 25 which also provides a signal to the transmitter 11. Another input 26 of the relay 20 is connected to a direct current voltage source 27 suitable for operation of the optically sensitive resistor 17 and the preamplifier 18.

In operation, the transmitter "ready" signal source 25 provides a signal at the input 24 of the solid state relay 20 which opens the relay "switch" 201 thereby deactivating preamplifier 18 by disconnecting the 45 volt power supply 27 from the power input terminal 22 of the preamplifier 18. Disconnecting the power supply 27 also deenergizes the diode 21 thereby terminating its light output 211 which causes the resistor 23 to assume a high resistance value in a time which typically is less than 0.1 sec. Shortly after resistor 23 attains its high resistance, the transmitter ready signal source 25 provides a signal on line 28 to the modulated transmitter 11 which provides a high power pulse of audio frequency energy to be transmitted through the aperture switch 14 to the diodes 15 and 16. Because of the high power provided by transmitter 11, the voltage across diodes 15, 16 is sufficiently high to cause the diodes to conduct and to provide a low impedance path to the high power which is provided to the transducer 13. The high impedance of the resistor 23 relative to the input impedance of the preamplifier 18 greatly attenuates the magnitude of the voltage which is presented to the input of the preamplifier 18 thereby preventing the preamplifier 18 from being harmed by the existence of a relatively large voltage across the transducer 13. The absence of the power supply voltage from power supply 27 at the power input terminal 22 of preamplifier 18 limits the amount of voltage which inadvertently passes through the preamplifier into the receiver 12. The signal on line 28 from the transmitter ready signal source 25 turns off the modulated transmitter 11 after the transmitter has been on for a predetermined length of time. After the transmitter has been turned off, the transmitter ready signal source 25 terminates the signal provided on the control terminal 24 of solid state relay 20 thereby causing the relay "switch" 201 to close and to apply the 45 volt power supply 27 through the diode 21 to the power input terminal 22 of the preamplifier 18. The energization of the diode 21 causes the resistor 23 to change its resistance in typically as little as 3 milliseconds from a value of approximately $10^{12}$ ohms during the time that the transmitter is on to approximately $10^3$ ohms when the transmitter is off. The significant change in resistance of the resistor 23 effectively disconnects the receiver during the time that the transmitter 11 is providing power to the transducer 13. It is also seen that the low value of resistance of resistor 23 relative to the resistance of diodes 15, 16 when the transmitter is not providing power effectively couples all the power from the transducer 13 to the input terminal 24 of the preamplifier 18. During the time that the transmitter is off and the receiver 12 is operational, the diodes 15, 16 act as an open circuit inasmuch as the voltage which appears across them is so small that they are effectively nonconductors. The nonconducting state of the diodes 15, 16 also isolates the receiver 20 from undesired noise pickup on the line 141 which connects the transmitter switch 14 to the transducer 13.

The solid state d.c. relay 20 is a commercially available relay. Typically, a type 643-1 relay made by the Teledyne Company is suitable for the purposes of this invention. Also, commercially available opto-isolators which provide d.c. to d.c. isolation using transistor switching would be suitable. Similarly, the optically sensitive resistor 17 is also commercially available and a type CK2147 made by the Raytheon Company is satisfactory. The "dark" (high) resistance state of the resistor 17 has a voltage standoff rating at least as great as the voltage across transducer 13 when driven by transmitter 11. The preamplifier 18 is of the type normally used in sonar receivers. The radiation illuminated or "light" resistance of the resistor 23 is chosen to be compatible with the input circuitry of the preamplifier.

Having described a preferred embodiment of the invention, it will now be apparent to one of skill in the art that other embodiments incorporating its concept may be used. It is felt, therefore, that this invention should not be restricted to the disclosed embodiment but rather should be limited only by the spirit and scope of the appended claims.

I claim:

1. A transmit/receive system for a sonar system comprising:
   a transmitter of electrical energy;
   a transducer connected to said transmitter;
   a receiver;
   means connecting said receiver to said transducer;
   means for providing a control signal;
   said connecting means having a high resistance state and a low resistance state in response to said control signal;
   means for providing electrical energy to said transducer for a time from said transmitter;
   means for providing said control signal to said connecting means to provide a high resistance state in said connecting means during the time said transducer is being energized;
   said connecting means comprising:
   a radiation sensitive impedance means connected between said transducer and said receiver;
   a radiation source for providing radiation upon said impedance means in response to said control signal;
   a power supply;
   a switch means responsive to said control signal to connect said power supply to said radiation source in response to said control signal.

2. The system of claim 1 wherein said receiver has a direct current power input terminal, said switch means being connected to said power input terminal and responsive to said control signal to apply said power supply to said receiver power input terminal.

3. The system of claim 1 wherein:
   said switch means is a solid state direct current relay;
   said power supply is a direct current power supply;
   said direct current power supply being connected to an input terminal of said relay;
   said relay being connected to said control signal means to energize an output terminal of said relay by said power supply in response to said control signal; and
   said receiver has a direct current power input terminal;
   said relay output terminal being connected through said radiation source to said direct current power input terminal of said receiver.

4. The system of claim 1 wherein said impedance means is a radiation-sensitive resistor.

5. An amplifier isolation system comprising:
   a source of signals;
   an amplifier;
   photosensitive resistor means coupling said amplifier to said signal source;
   control means optically connected to said resistor means for changing the resistance of said resistor means to controllably isolate said amplifier from said signal source;
   said amplifier having a direct current power input terminal for energizing said amplifier;
   a direct current power supply;
   said control means provides said power supply to said amplifier power input terminal through said control means.

6. The system of claim 5 wherein:
   said control means comprises a source of optical radiation and a switch connected to said power supply;
   said power supply being provided to said amplifier power input terminal through said switch.

* * * * *